April 2, 1940. W. A. J. GOVAN 2,196,013
COUPLING OR LOCKING DEVICE
Filed Feb. 28, 1938
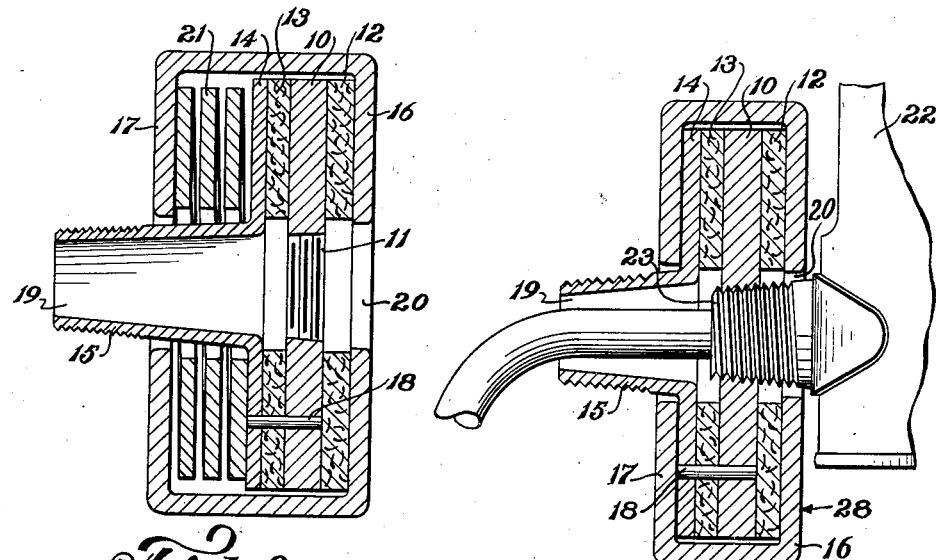
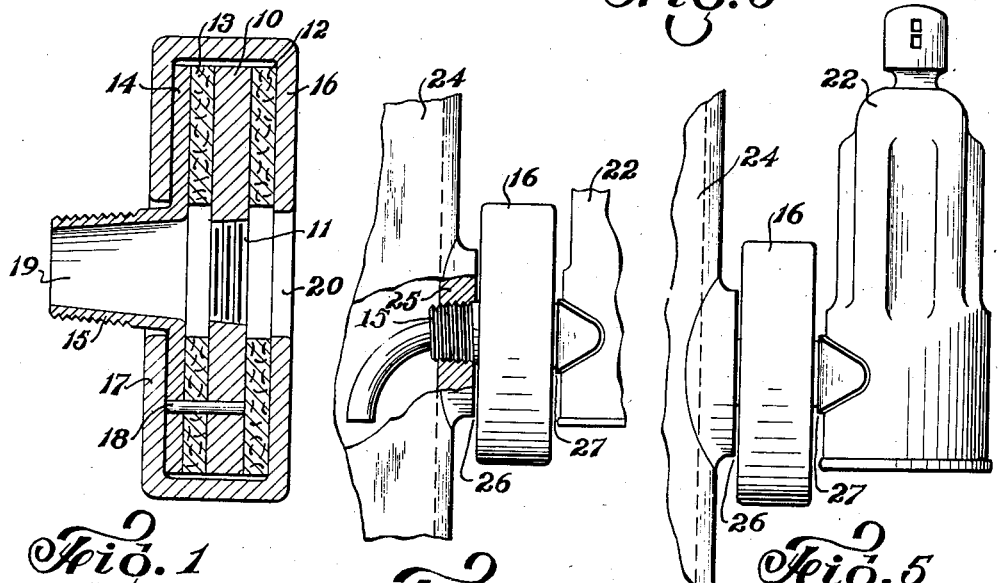
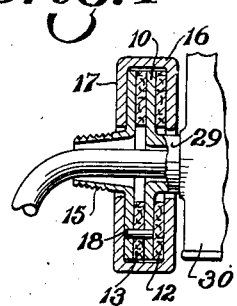
INVENTOR
WILLIAM ARTHUR J. GOVAN
BY
Van Deventer & Greer
ATTORNEYS Patented Apr. 2, 1940

2,196,013

UNITED STATES PATENT OFFICE 2,196,013

COUPLING OR LOCKING DEVICE

William Arthur J. Govan, Beechhurst, Long Island, N. Y., assignor of one-half to Jack Marks, College Point, N. Y.

Application February 28, 1938, Serial No. 193,087

5 Claims. (Cl. 285—193)

This invention relates to a coupling or locking device for use where two hollow members, at least one of which is rotatable about an axis, are to be joined in fluid-tight relationship.

The invention is particularly applicable to a lock for radiator valves or the like and for the sake of illustration will be described as used for this purpose.

It will be understood, however, that the invention is not limited to the specific use herein set forth but may be used with either valves or similar devices or for any other purpose to which the invention is applicable.

An object of the invention is the provision of a simple and cheap coupling for the air valves of radiators that permits attaching the valve to the radiator without the use of special tools, the valve so attached being secured to the radiator in such a manner as to prevent pilfering.

Such air valves are commonly provided with a threaded nipple which is screwed into a tapped hole in the radiator, this usually constituting the sole means of attaching and supporting the valve. The valve is therefore easily removed without the use of tools as the valve body is usually large enough to provide leverage so that a person of ordinary strength can unscrew it by hand. The present invention eliminates this possibility.

Another object of the invention is to provide a coupling secured to and positioned between the radiator and the valve so as to support the latter, while locking same in place. The coupling may permit free turning of the valve instead of definitely positioning same, as is the case, for example, with the valve lock shown in U. S. patent to Simpson 1,688,400 dated October 23, 1928.

A further object is to provide a coupling that is attachable without the necessity of changing existing radiators and valves and which when in use does not exercise any wedging pressure or force against any part of the valve, the latter being freely turnable about the valve nipple as an axis.

The invention consists substantially in the construction, combination, location and relative arrangement of parts, all as will be more fully hereinafter set forth and as shown by the accompanying drawing and finally pointed out in the appended claims.

In the accompanying drawing:

Figure 1 is a cross sectional view of a coupling embodying the invention;

Figure 2 is a cross sectional view of an alternate form of the coupling shown in Figure 1;

Figure 3 is a view, partly in cross section, showing either of the couplings, Figures 1 or 2, attached to a radiator air valve;

Figure 4 is a view, partly in cross section, showing either of the couplings, Figures 1 or 2, attached to an air valve and a radiator;

Figure 5 is an external view showing a radiator with an air valve connected thereto using either of the couplings shown in Figures 1 or 2; and Figure 6 is a view, partly in section, of an air valve having either of the couplings, Figures 1 or 2, permanently connected thereto and forming part thereof.

In Figure 1 the numeral 10 denotes a disk of suitable material such as steel or the like having a center tapered threaded hole 11. This disk forms the interior member of the coupling constituting this invention and this disk is clamped between the friction disks 12, 13 formed of fiber or other suitable material. Adjacent the outer surface of disk 13 is a flanged member 14 provided with the central outwardly extending tapered threaded neck 15. This member is securely clamped with its flat flanged portion in extended surface engagement with the friction disk 13 by means of the outer casing 16. This casing initially is formed like a shallow cup to hold the disk 10, the friction disks 12 and 13 and the flanged portion of the member 14 all in close frictional relationship and after these parts are assembled in the casing 16 the wall 17 thereof is turned over against the outer surface of the flanged member 14 and is spun or pressed thereagainst in order to hold the complete assembly in position as shown in Figure 1.

Before the wall 17 is closed into place as just described, a shear pin 18 is driven through the flange of the member 14, through the friction disk 13 and at least part way through the center disk 10, thereby locking the disk 10 and the flanged member 14.

It will be observed that a clear passage for fluid extends through the coupling, this passage being comprised of the passage 19 in the hollow neck 15, the central aperture in the disk 13 and the internally threaded aperture in the disk 10. The disk 12 also has a central aperture and the casing 16 has an aperture 20, the two last apertures adapted to permit the threaded nipple 23 of the air valve to be threaded into the aperture in the disk 10.

Referring to Figure 2 which shows an alternate form of construction, the arrangement and assembly of the parts is substantially the same as for the coupling just described except that in some instances it may be desirable to have more frictional engagement of the two parts of the coupling. This is accomplished by interposing the resilient means such as the spring 21 between the outer surface of the flanged member 14 and the inner surface of the wall 17 of the casing 16. This spring urges the flanged member 14 into frictional engagement with the disks 12 and 13 and the center disk 10.

In either of the couplings shown in Figures 1 and 2, the extended surface engagement of the parts is such as to prevent any leakage of fluid which might otherwise occur laterally between disk 13 and the adjacent walls of disk 19 and the flanged member 14. All fluid is therefore maintained within the center of the coupling and there is little or no escape of fluid laterally and into the casing 16.

By way of example, the coupling is shown in Figures 3-5 inclusive as being applied to an ordinary air valve as used with radiators of heating systems. These air valves are commonly mounted in an exposed position and are capable of being removed by simply unscrewing them. Such a valve of any suitable type is indicated by the numeral 22 and such valves are provided with an outwardly extending tapered threaded nipple 23 which ordinarily is screwed directly into the radiator. When the improved coupling is used, however, the nipple 23 is screwed hand tight into the disk 10 as shown at Figure 3, the coupling being screwed on said nipple as tightly as possible without shearing the pin 18. This complete assembly of the valve and coupling as shown in Figure 3 is then secured to the radiator 24 by screwing the tapered threaded neck 15 of the coupling into the usual tapped hole 25, Figure 4 and when the neck 15 is screwed tightly into place additional turning force applied to the valve 22 will in turn be applied to the disk 10 in the coupling and this force will shear the pin 18. This completes the installation of the coupling.

It will now be obvious that the valve 22 may be revolved about the axis of the nipple 23 in either direction and it is free to turn with the disk 10. It will also be noted that if the outer casing 16 is gripped with a wrench or pliers that it too may be revolved on the other parts without unscrewing the neck 15 from the radiator and without unscrewing the nipple 23 from the disk 10. As the space 26 between the radiator and the coupling is not sufficient to enable the threaded neck 15 to be reached with any tool, it is obvious that the coupling could not be detached in this manner and as the space 27 between the coupling and the valve is too short to permit the access of any tool it is obvious that the valve cannot be detached from the coupling and it will be apparent that the valve can no longer be detached by the average casual thief or by unauthorized persons who often remove the air valves thinking that thereby they will be able to get more heat out of the radiator.

Obviously, the valves could be cut off the radiators with a hack saw but a casual thief does not possess such a saw and in most cases the use of it would mutilate the valve and render it useless.

To remove the valve it is merely necessary to drill a hole through the casing at some suitable point such as indicated by the arrow 28, Figure 3. In this hole is placed a steel drill or pin that will not shear when pressure is applied to the valve. This permits unscrewing the coupling from the radiator and unscrewing the valve from the coupling. The drill can be left in place when the parts are again reassembled or a shear pin can be substituted for the drill. If a shear pin is used it may be driven flush with the outer surface of the casing 16. If the drill is used instead of a shear pin when replacing the coupling it is finally withdrawn and a short escutcheon pin or the like is driven into the hole at 28. This method of removing and replacing the coupling in service eliminates all special wrenches or the like.

Figure 6 shows a further modification of the invention wherein the coupling or lock forms an integral part of the air valve, being permanently attached thereto. Referring to the figure, the disk or member 10 has an outwardly extending tubular neck portion 29 which is threaded on or into the body 30 of the valve. This neck may be soldered or welded to the valve so that it cannot be removed therefrom, and the coupling therefore forms part of the valve.

The installation and removal of this form of valve and coupling from the radiator will be obvious from the preceding description of these operations as performed with the valves shown in Figures 1 and 2. The rupturable member or shear pin 18 acts in the same manner as previously described.

Although the invention has been disclosed in connection with the specific details of preferred embodiments thereof, it must be understood that such details are not intended to be limitative of the invention except insofar as set forth in the accompanying claims.

What is claimed is:

1. The combination with two hollow members to be joined at least one of which is rotatable about a given axis, of a coupling comprising a casing, coupling members within said casing adapted for attachment to said hollow members and held in frictional relationship with said casing, one of said coupling members having a part extending from said casing and said part having means thereon for engagement with one of said hollow members as aforesaid, and a shear pin within said casing uniting said coupling members and adapted to shear by reason of excess turning force about said axis applied to one of said hollow members and thereby applied to one of said coupling members to shear said pin therebetween.

2. A coupling comprising a casing, a disk-shaped member therein having an interiorly threaded central aperture, a second disk-shaped member having a hollow externally threaded neck in fluid communication with the aperture in said first member and extending outwardly from said casing, means in said casing comprising a floating friction disk for maintaining said members in fluid-tight engagement while permitting same to be rotated within said casing, and a rupturable member within said casing uniting said members therein, said rupturable member adapted to shear upon excess pressure being applied thereto by turning one of said members about the axis of said threaded neck.

3. The combination with two hollow members to be joined at least one of which is rotatable about a given axis, of a coupling interposed between said members including two flange-like coupling members, each of said members being secured to one of said hollow members, both members of said coupling being initially united by means adapted to shear when either of said coupling members is rotated about said axis, and means including a friction disk having its faces in engagement with the faces of said coupling members and forming part of said coupling for maintaining the coupling members thereof in fluid-tight relation with the interior of said hollow members.

4. The combination with a hollow structure forming a support and an accessory article applicable to and removable therefrom by rotation about a given axis, of a coupling comprising a casing, a pair of disk-like coupling members, a friction disk mounted between said members, said members and said disk being rotatably mounted in said casing and positively maintained in fluid-tight relationship, one of said members being in fluid connection with the interior of said support, the other of said members being enclosed within said casing, said article having an outwardly extending portion in fluid connection with said last member within the casing, and a frangible pin extending through both said coupling members and said friction disk.

5. In a device of the character described, a pair of disk-like coupling members adapted to maintain a passageway for fluid, a casing surrounding said members, means including a friction disk in said casing and co-operating therewith to maintain said members in fluid-tight relationship, and conduit means extending through a wall of the casing for conducting fluid to said members, said casing being freely rotatable about said members, and each member being independently rotatable within the casing, said coupling members and said disk having holes therein, said holes being adapted to be aligned with each other and a frangible pin inserted before said members are assembled in said casing.

WILLIAM ARTHUR J. GOVAN.